United States Patent [19]

Dodson

[11] 4,318,744

[45] Mar. 9, 1982

[54] STRENGTH ENHANCING ADMIXTURE FOR CONCRETE COMPOSITIONS

[75] Inventor: Vance H. Dodson, Walpole, Mass.

[73] Assignee: W. R. Grace & Co., Cambridge, Mass.

[21] Appl. No.: 156,992

[22] Filed: Jun. 6, 1980

[51] Int. Cl.³ .............................................. C04B 7/35
[52] U.S. Cl. ................................. 106/90; 106/315
[58] Field of Search ............................... 106/90, 315

[56] References Cited

U.S. PATENT DOCUMENTS

| | | | |
|---|---|---|---|
| 3,090,692 | 5/1963 | Kelly et al. | 106/92 |
| 3,432,317 | 3/1969 | Kelly et al. | 106/92 |
| 3,619,221 | 11/1971 | Kossivas | 106/315 |
| 3,782,991 | 1/1974 | Burge | 106/315 |
| 3,801,338 | 4/1974 | Whitaker | 106/315 |
| 4,054,462 | 10/1977 | Stude | 106/315 |
| 4,092,109 | 5/1978 | Rosenberg et al. | 106/315 |
| 4,116,706 | 9/1978 | Previte | 106/315 |
| 4,210,457 | 7/1980 | Dodson | 106/97 |

FOREIGN PATENT DOCUMENTS 940692  10/1963  United Kingdom ......... 106/DIG. 1

OTHER PUBLICATIONS

Letter of V. H. Dodson, Sep. 25, 1980, Entitled: "Early Field Testing Of Fly Ash Concrete Admixture".
Abstract, German Pat. No. 2,740,114, 9/7/76.

*Primary Examiner*—James Poer
*Attorney, Agent, or Firm*—William L. Baker; C. Edward Parker

[57] ABSTRACT

An admixture for Portland cement compositions and particularly Portland cement concrete compositions which contain pozzolans such as fly ash and blast furnace slag is described which is a mixture containing at least three specified chemical ingredients. The admixture improves the strength and other properties of the compositions.

9 Claims, No Drawings

STRENGTH ENHANCING ADMIXTURE FOR CONCRETE COMPOSITIONS

BACKGROUND OF THE INVENTION

A pozzolan is defined by the American Concrete Institute as "a siliceous or siliceous and aluminous material, which in itself possesses little or no cementitious value but will, in finely divided form and in the presence of moisture, chemically react with calcium hydroxide at ordinary temperatures to form compounds possessing cementitious properties". Raw or calcined natural pozzolans include such materials as diatomaceous earths, opaline cherts and shales, tuffs, volcanic ashes and pumicites. Man-made pozzolans are typified by fly ash, the finely divided residue that results from the combustion of coal, and blast furnace slag.

Portland cement is a product produced by heating a mixture of limestone and clay or shale, or other calcareous and argillaceous materials to a fused state. The fused product, which is called clinker, is interground with a few percent, normally about 4 to 6 percent, of a retarder such as gypsum. Portland cement is mixed with aggregate such as sand and stone to form a concrete having outstanding structural properties.

Pozzolans are commonly used in concrete and are either added to the concrete separately from the Portland cement at the concrete ready-mix plant or added together with the Portland cement as a special blended cement, such as a type "IP,IS" cement. The presence of a pozzolan in concrete increases the workability and decreases the bleeding characteristics of the fresh, plastic concrete. It also improves the properties of the hardened concrete by reducing its shrinkage, reducing its permeability and ultimately increasing its strength. Early usage of pozzolan in concrete was as a substitute for part or all of the "fine" aggregate component such as sand.

Pozzolans are most often used in concrete as a partial replacement for Portland cement and the replacement of 20% or more of the cement with a pozzolan is not uncommon. Pozzolans contribute strength to concrete by reacting with the calcium hydroxide $(Ca(OH)_2)$ that is liberated by the Portland cement, when it reacts with water, and forms reaction products similar to those produced by the cement-water reaction. The chemical reaction between the pozzolan and the calcium hydroxide is often referred to as the "pozzolanic reaction".

The "pozzolanic reaction" is a very slow one and the strength contributed by the pozzolan is not significant until the concrete reaches 28 to 90 days of age. This means that a concrete in which a portion of the cement has been replaced with a pozzolan will inherently have lower compressive strength up to 28 to 90 days than the Portland cement concrete from which the pozzolan concrete was designed. A part of this strength reduction can be compensated for by altering the coarse and fine aggregate content of the pozzolan Portland cement concrete.

Certain chemical admixtures which have been formulated for use in Portland cement concrete also aid in off-setting the early strength deficiency of Portland cement pozzolan concrete. Such chemicals as salts of lignosulfonic acid, salts of hydroxylated carboxylic acids, sugars and corn syrups have been commonly used in concrete containing a pozzolan, but all of these materials delay the setting time of the concrete which already has an abnormally long setting time because of the pozzolan that is present.

Calcium chloride is also frequently used as an admixture in Portland cement pozzolan concrete to accelerate its set and enhance its early strength. The amount of calcium chloride commonly used is in the range of 1 to 2% on the weight of the cement. Other chloride salts such as sodium chloride have been suggested as accelerators for Portland cement pozzolan concrete (British Pat. No. 940,692 to Fombonne). Additions of chloride ion in amounts in excess of 0.5 percent on the weight of the cement pose a corrosion problem to any metal embedded in the concrete. Also at high sodium additions (greater than 0.5 percent on the cement) problems are posed by alkali-aggregate reactions.

Another admixture for pozzolan-containing Portland cement concrete that has been sold and used successfully for several years is constituted of a mixture of calcium lignosulfonate and triethanolamine (95%-5% mixture). There is a continuing need however for alternative and/or improved admixtures.

SUMMARY OF THE INVENTION

The present invention concerns an admixture for concrete, pozzolan containing Portland cement concrete in particular, which (a) enhances the strength of the concrete, (b) accelerates the setting time of the concrete and (c) does not pose corrosion or alkali-aggregate reaction problems. The admixture is a combination of three or more chemical substances which, when added together, produce strength improvement and reductions of setting time that are unexpected and unexplainable on the basis of what each of the individual substances demonstrates in concrete, when added by itself. The admixture can be used per se, or with other conventional additives such as air-entraining additives.

DETAILED DESCRIPTION OF THE INVENTION

The inventive admixture is a mixture of at least three chemical substances, and contains at least one ingredient from each of the Groups designated as "A", "B" and "C" in Table 1.

TABLE I

| Group | Substance | ADDITION RATE (% Solids of Wt. Cmt. + Pozzolan) Preferred | Suggested |
|---|---|---|---|
| A | Salt of Lignosulfonic Acid | 0.055 to 0.203% | |
| | Hydroxylated Carboxylic Acid or Salt Thereof | 0.014 to 0.042% | 0.014 to 0.203% |
| | Glucose Polymer | 0.014 to 0.042% | |
| B | Alkanolamine | 0.005 to 0.300% | 0.005 to 0.300% |
| C | Sodium Chloride | 0.050 to 0.300% | |
| | Sodium or Calcium Nitrite | 0.100 to 0.200% | 0.050 to 0.300% |
| | Formic Acid | 0.050 to 0.150% | |

The salts of lignosulfonic acid employed herein include, for example, calcium lignosulfonate and sodium lignosulfonate. Preferred hydroxylated carboxylic acids used herein are those containing about 6 to 10 carbon atoms such as gluconic acid and heptogluconic acid. Preferred also are the sodium salts thereof. The glucose polymers employed herein include polymers containing polymerized glucose units such as "corn syrups" and "dextrins". The glucose polymers should preferably form aqueous mixtures when combined with amounts of water conventionally used in concrete-making plants, having viscosities which render the mixtures easily dispensable.

The inventive admixture is added to concretes containing Portland cement binder and from about 15 to about 25% of pozzolan, based upon the total weight of cement and pozzolan. The concretes typically also contain non-pozzolanic aggregate (e.g. sand and stone) in greater than 50% by volume of the hardened concrete.

In a number of laboratory experiments described in the following examples, concrete compositions containing Portland cements from several manufacturing sources and various pozzolans were prepared. The chemical compositions of the individual cements and pozzolans (fly ash, "natural" pozzolan, and blast furnace slag) are given in Table II. Various chemical admixtures were added to certain of the concrete compositions and properties of the resulting compositions measured. Properties measured included "percent air" (ASTM C231), "slump" (ASTM C143), "setting time" (ASTM C403) and "compressive strength" (ASTM C31). The pozzolan-containing concretes contained, in addition to Portland cement and pozzolan, "coarse" aggregate (ground limestone) and "fine" aggregate (sand) as conventionally employed in "concrete". In the experiments, the pozzolan was considered as a substitute for cement which would have been used in a typical concrete formulation. In the experiments, a ratio of 55–45%, limestone to sand, of total aggregate employed, was used. (Conventional concretes typically contain cement and aggregate, the aggregate being present in greater than 50 percent by volume of the set product).

The amounts of the various admixtures added in the following examples were those determined from previous experiments to be "optimum" from the standpoint of achieving desired setting times and strength enhancement.

TABLE II

| | Composition of Portland Cements and Pozzolans Used in EXAMPLES | | | | | | | | |
|---|---|---|---|---|---|---|---|---|---|
| | Portland Cement | | | | Fly Ash | | | | |
| | Source A | Source B | Source C | Source D | Source F | Source G | Source H | Natural Pozzolan | Blast Furnace Slag |
| % $SiO_2$ | 21.0 | 21.1 | 21.0 | 21.4 | 48.9 | 47.6 | 47.1 | 45.4 | 40.0 |
| % $Al_2O_3$ | 5.0 | 4.6 | 5.6 | 4.4 | 29.6 | 23.3 | 20.8 | 25.3 | 13.5 |
| % $Fe_2O_3$ | 2.8 | 2.0 | 2.8 | 3.3 | 9.3 | 16.0 | 16.0 | 15.5 | 1.8 |
| % CaO | 64.4 | 65.1 | 63.6 | 65.3 | 6.2 | 7.6 | 5.0 | 9.0 | 39.2 |
| % MgO | 2.5 | 2.5 | 2.2 | 1.2 | 0.7 | 1.4 | 1.8 | 1.2 | 3.6 |
| % $SO_3$ | 2.7 | 2.8 | 2.5 | 2.9 | 0.6 | 0.7 | 0.6 | 1.6 | 0.2 |
| % L.O.I. | 1.3 | 1.4 | 1.3 | 0.9 | 2.3 | 0.6 | 2.8 | 0.6 | 0.0 |
| Fineness $cm^2/g$ | 4360 | 3455 | 3720 | 3250 | 2814 | 2314 | 3306 | 2970 | 3310 |
| % $C_3S$ | 57.3 | 62.6 | 50.6 | 60.8 | — | — | — | — | — |
| % $C_2S$ | 17.0 | 13.2 | 22.1 | 15.5 | — | — | — | — | — |
| % $C_3A$ | 8.5 | 8.8 | 10.1 | 6.1 | — | — | — | — | — |
| % $C_4AF$ | 8.5 | 6.2 | 8.5 | 10.0 | — | — | — | — | — |
| % $CaSO_4$ | 4.6 | 4.8 | 4.2 | 4.9 | — | — | — | — | — |

EXAMPLE I

Three chemicals mentioned above as components of the admixture of this invention were added to concrete as separate entities (Concretes 1–4, Table III) and their separate effects on the properties of concrete were compared with the effects of the same three chemicals when added together (Concrete Mix 5, Table III). The pertinent test data are summarized in Table III.

TABLE III

| Concrete Mix No.[a] | Air % | Slump in | Admixture | Add'n Rate % Solids on Wt. Cmt. + Fly Ash | Compressive Strength-PSI | | | Setting Time[b] | |
|---|---|---|---|---|---|---|---|---|---|
| | | | | | 1-Day | 7-Day | 28-Day | Initial Hr:Min | Final Hr:Min |
| 1 | 1.5 | 2½ | None (Reference) | — | 825 | 3167 | 4524 | 5:55 | 7:35 |
| 2 | 2.0 | 3¼ | Sodium heptogluconate | 0.028 | 1080 | 3714 | 4863 | 6:20 | 8:00 |
| 3 | 1.6 | 3 | Sodium chloride | 0.100 | 919 | 3483 | 4876 | 5:50 | 7:40 |
| 4 | 1.6 | 2½ | Triethanolamine | 0.010 | 885 | 3583 | 5211 | 6:00 | 7:40 |
| 5 | 1.7 | 3 | Sodium heptogluconate Sodium chloride Triethanolamine | 0.028 0.100 0.010 | 1045 | 3830 | 5099 | 5:30 | 7:10 |

[a]All of the test concretes contained 396 lbs of Cement A and 125 lbs of Fly Ash F per cubic yard. The water contents of the concretes varied from 290 to 299 lbs per cubic yard.
[b]Measured in accordance with ASTM C403.

The sodium heptogluconate (Mix No. 2, Table III), caused an excellent increase in strength at 1 day but at 28 days the strength increase was only marginal. The sodium chloride in Mix No. 3 provided only moderate to marginal strength gains at all ages of test. The triethanolamine in Mix No. 4 produced only moderate strength gains at 1 and 7 days age and a very good strength increase at 28 days. The combination of the three in Mix No. 5, however, produced excellent to very good strength gains at all three ages of test. When added separately, the heptogluconate extended (retarded) the setting time while the sodium chloride and the triethanolamine had no significant effect on the time of set of the concrete. The combination (Mix No. 5) however, produced a significant acceleration of set.

EXAMPLE II

Concretes were fabricated to investigate the influence of various mixtures of four chemical ingredients on the strength of fly ash concrete. The test data, which are listed in Table IV, clearly showed that all of the combinations of sodium heptogluconate, calcium lignosulfonate, triethanolamine and sodium chloride produced very acceptable strength gains, at all of the ages of test, over those of the non-admixtured reference, Mix No. 6.

(Mix No. 23), the combination of it with the other two components, sodium heptogluconate and triethanolamine, only increase the effectiveness of the admixture as a strength enhancer at the early ages.

TABLE IV

| Concrete Mix No.[a] | Na-hepto gluconate Addition Rate % Solids on CMT + FA | Calcium Lignosulfonate Addition Rate % Solids on CMT + FA | Triethanol- amine Addition Rate % Solids on CMT + FA | Sodium Chloride Addition Rate % Solids on CMT + FA | Compressive Strength-PSI[b] | | | | Ave |
|---|---|---|---|---|---|---|---|---|---|
| | | | | | 1-Day | 3-Day | 7-Day | 28-Day | |
| 6 | None | None | None | None | 905 (100) | 1903 (100) | 2874 (100) | 4176 (100) | |
| 7 | 0.042 | 0.141 | 0.007 | 0.05 | 1325 (146) | 2542 (134) | 3530 (123) | 5077 (122) | 131 |
| 8 | 0.042 | 0.141 | 0.007 | 0.10 | 1369 (151) | 2550 (134) | 3539 (123) | 4858 (116) | 131 |
| 9 | 0.042 | 0.141 | 0.007 | 0.15 | 1318 (146) | 2375 (125) | 3390 (118) | 4738 (113) | 125 |
| 10 | 0.028 | 0.141 | 0.007 | 0.05 | 1326 (146) | 2549 (134) | 3459 (120) | 4996 (120) | 130 |
| 11 | 0.028 | 0.141 | 0.007 | 0.10 | 1350 (149) | 2792 (147) | 3515 (122) | 4893 (117) | 134 |
| 12 | 0.028 | 0.141 | 0.007 | 0.15 | 1337 (148) | 2813 (148) | 3716 (129) | 4864 (116) | 135 |
| 13 | 0.028 | 0.113 | 0.006 | 0.05 | 1205 (133) | 2555 (134) | 3401 (118) | 4701 (113) | 124 |
| 14 | 0.028 | 0.113 | 0.006 | 0.10 | 1377 (152) | 2601 (137) | 3487 (121) | 4805 (115) | 131 |
| 15 | 0.028 | 0.113 | 0.006 | 0.15 | 1386 (153) | 2644 (139) | 3495 (122) | 4554 (109) | 131 |
| 16 | 0.028 | 0.169 | 0.009 | 0.05 | 1286 (142) | 2703 (142) | 3495 (122) | 4750 (114) | 130 |
| 17 | 0.028 | 0.169 | 0.009 | 0.10 | 1426 (158) | 2802 (147) | 3778 (131) | 5010 (120) | 139 |
| 18 | 0.028 | 0.169 | 0.009 | 0.15 | 1463 (162) | 2757 (145) | 3745 (130) | 4972 (119) | 139 |

[a]All of the test concretes
contained 388–392 lbs. of Cement B/cu. yd. of concrete
contained 120–121 lbs. of Fly Ash G/cu. yd. of concrete
contained 260–280 lbs. of Water/cu. yd. of concrete
All of the concretes had slumps in the range of 2¾ to 3¾ inches and air contents that varied from 1.2 to 2.0%.
[b]The numbers in ( ) represent the strength improvement as a percentage of the reference concrete, Mix No. 6.

TABLE V

| Concrete[a] Mix No. | Sodium Heptogluconate Addition Rate % Solids on Cmt & FA | Triethanolamine Addition Rate % Solids on Cmt & FA | Sodium Chloride Addition Rate % Solids on Cmt & FA | Compressive Strength - PSI[b] | | |
|---|---|---|---|---|---|---|
| | | | | 1-Day | 7-Day | 28-Day |
| 19 | None | None | None | 820 (100) | 3500 (100) | 5002 (100) |
| 20 | 0.028 | 0.01 | None | 830 (101) | 3620 (103) | 5245 (105) |
| 21 | 0.028 | 0.01 | 0.10 | 1058 (129) | 3963 (113) | 5727 (114) |
| 22 | 0.028 | 0.01 | 0.20 | 1367 (167) | 4238 (127) | 5474 (109) |
| 23 | 0.028 | 0.01 | 0.30 | 1367 (167) | 4170 (119) | 5523 (110) |

[a]All of the test concretes contained
384 lbs of cement C/cubic yard
119 lbs of Fly Ash G/cubic yard
259 to 265 lbs of water/cubic yard
[a]All of the test concretes had slumps in the range of 2¼ to 3¼ inch and contained 1.5 to 1.7% air.
[b]The numbers in ( ) represent the strength improvement as a percentage of the reference concrete, Mix No. 19.

EXAMPLE III

The data in Table IV indicated that over the addition range of 0.5 to 0.15% there was very little difference in the strength enhancement provided by the sodium chloride. Another series of concretes was prepared to which larger amounts of sodium chloride were added. The calcium lignosulfonate was omitted as an ingredient of the admixture. The test data, shown in Table V, clearly indicated that the sodium chloride was important to the performance of the admixture and that as its addition rate was increased from 0.0% (Mix No. 20) to 0.30%

EXAMPLE IV

While the preferred composition of this invention is a mixture of sodium heptogluconate, triethanolamine, calcium lignosulfonate and sodium chloride and/or a mixture of sodium heptogluconate, triethanolamine and sodium chloride, a number of alternate materials were found that could be used to formulate the admixture. The concrete test data in Tables VI and VII showed that sodium gluconate and/or a glucose polymer could be used as a substitute for sodium heptogluconate and that formic acid and/or sodium nitrite could be used in place of sodium chloride.

TABLE VI

| Concrete Mix No.[a] | Admixture Components | % Solids on Weight of Cement + Fly Ash | Compressive Strength - PSI[b] | | | |
|---|---|---|---|---|---|---|
| | | | 3-Day | 7-Day | 28-Day | 90-Day |
| 24 | None | — | 1884 (100) | 2735 (100) | 4110 (100) | 5547 (100) |
| 25 | Sodium gluconate | 0.028 | 2709 (144) | 3423 (125) | 4880 (119) | 6544 (118) |
| | Triethanolamine | 0.007 | | | | |
| | Calcium lignosulfonate | 0.141 | | | | |
| | Sodium chloride | 0.100 | | | | |
| 26 | Glucose polymer | 0.028 | 2652 (141) | 3491 (128) | 4978 (121) | 6653 (120) |
| | Triethanolamine | 0.007 | | | | |
| | Calcium lignosulfonate | 0.141 | | | | |
| | Sodium chloride | 0.100 | | | | |
| 27 | Sodium gluconate | 0.028 | 2231 (118) | 3360 (123) | 4945 (120) | 6357 (115) |
| | Triethanolamine | 0.040 | | | | |

TABLE VI-continued

| Concrete Mix No.[a] | Admixture Components | % Solids on Weight of Cement + Fly Ash | Compressive Strength - PSI[b] | | | |
|---|---|---|---|---|---|---|
| | | | 3-Day | 7-Day | 28-Day | 90-Day |
| 28 | Formic acid | 0.010 | 2183 (116) | 3190 (117) | 5141 (125) | 6377 (115) |
| | Glucose polymer | 0.028 | | | | |
| | Triethanolamine | 0.040 | | | | |
| 29 | Formic acid | 0.010 | 2290 (121) | 3405 (124) | 5080 (124) | 6257 (113) |
| | Sodium gluconate | 0.028 | | | | |
| | Triethanolamine | 0.047 | | | | |
| | Calcium lignosulfonate | 0.141 | | | | |
| | Formic acid | 0.010 | | | | |

[a] All of the test concretes contained
384-388 lbs. of cement B/cubic yard
113-114 lbs. of Fly Ash F/cubic yard
260-278 lbs. of water/cubic yard
All of the test concretes had slumps in the range of 2¼ to 3¼ inches and contained 1.1 to 2.3% air.
[b] The number in ( ) represent the strength improvement as a percentage of the reference concrete, Mix No. 24.

TABLE VII

| Concrete Mix No. | Admixture Components | % Solids on Wt. of Cmt. & Fly Ash | Compressive Strength - PSI[b] | | |
|---|---|---|---|---|---|
| | | | 1-Day | 7-Day | 28-Day |
| 30 | None | — | 800 (100) | 3035 (100) | 4699 (100) |
| 31 | Sodium Heptogluconate | 0.028 | 992 (124) | 3750 (124) | 5263 (112) |
| | Triethanolamine | 0.010 | | | |
| | Sodium nitrite | 0.100 | | | |
| 32 | Sodium Heptogluconate | 0.028 | 940 (117) | 3358 (111) | 5250 (112) |
| | Triethanolamine | 0.010 | | | |
| | Sodium nitrite | 0.200 | | | |
| 33 | Glucose polymer | 0.028 | 1012 (126) | 3492 (115) | 5360 (114) |
| | Triethanolamine | 0.010 | | | |
| | Sodium nitrite | 0.100 | | | |
| 34 | Glucose polymer | 0.028 | 1011 (126) | 3692 (122) | 5529 (118) |
| | Triethanolamine | 0.010 | | | |
| | Sodium nitrite | 0.200 | | | |

[a] All of the test concretes contained
- 388-392 lbs of Cement C/cubic yard
- 123-124 lbs of Fly Ash H/cubic yard
- 263-283 lbs of Water/cubic yard
[a] All of the test concretes had slumps in the range of 2¼ to 3¼ inches and contained 1.0 to 1.6% air.
[b] The numbers in ( ) represent the strength improvement as a percentage of the reference concrete, Mix No. 30.

EXAMPLE V

TABLE VIII

| Concrete Mix[a] No. | Admixture Components | | | Compressive Strength - PSI[b] | | |
|---|---|---|---|---|---|---|
| | Sodium Heptogluconate Add'n Rate % Solids on Cmt & FA | Triethanolamine Add'n Rate Solids on Cmt & FA | Sodium Chloride Add'n Rate % Solids on Cmt & FA | 1-Day | 7-Day | 28-Day |
| 35 | none | none | none | 750 (100) | 2621 (100) | 4129 (100) |
| 36 | 0.032 | 0.011 | 0.110 | 1381 (184) | 3905 (149) | 5239 (127) |
| 37 | 0.044 | 0.016 | 0.157 | 1122 (150) | 2914 (111) | 4459 (108) |
| 38 | 0.056 | 0.020 | 0.200 | 1204 (160) | 3024 (115) | 4467 (108) |

[a] All of the test concretes contained
- 388-392 lbs of Cement D/cubic yard
- 120-121 lbs of Fly Ash G/cubic yard
- 270-308 lbs of Water/cubic yard
[a] All of the test concretes had slumps in the range of 4 to 6 inches and contained 0.8 to 1.2% air.
[b] The numbers in ( ) represent the strength improvement as a percentage of the reference concrete, Mix No. 35.

A series of concretes was fabricated to evaluate the influence of combinations of sodium heptogluconate, triethanolamine and sodium chloride at relatively high dosage rates. The concrete test data in Table VIII showed that the combination was an effective strength enhancer for Portland cement-pozzolan concrete over the range of concentrations examined but that it was less effective at the two higher dosage levels.

EXAMPLE VI

An admixture according to this invention was evaluated in concretes containing a natural pozzolan and a finely divided blast furnace slag. The test data in Table IX indicated that both of the admixtured concretes possessed higher strengths, at all ages of test, than those of the non-admixtured concretes.

TABLE IX

| Concrete Mix No. | Cement lbs/yd³ | Natural Pozzolan lbs/yd³ | Slag lbs/yd³ | Water lbs/yd³ | Air % | Slump In. | Admixture | Compressive Strength - PSI[c] | | | |
|---|---|---|---|---|---|---|---|---|---|---|---|
| | | | | | | | | 1-Day | 7-Day | 28-Day | 90-Day |
| 39 | 398[a] | 116 | — | 285 | 1.3 | 3¼ | No | 1035 (100) | 3617 (100) | 5043 (100) | 6911 (100) |
| 40 | 398[a] | 116 | — | 279 | 1.1 | 4 | Yes[b] | 1460 (141) | 4158 (1157) | 5587 (111) | 7397 (107) |
| 41 | 451[c] | — | 113 | 265 | 4.5 | 1¼ | No | 895 (100) | 2850 (100) | 4520 (100) | NM[f] |

TABLE IX-continued

| Concrete Mix No. | Cement lbs/yd³ | Natural Pozzolan lbs/yd³ | Slag lbs/yd³ | Water lbs/yd³ | Air % | Slump In. | Admixture | Compressive Strength - PSI[e] | | | |
|---|---|---|---|---|---|---|---|---|---|---|---|
| | | | | | | | | 1-Day | 7-Day | 28-Day | 90-Day |
| 42 | 451[c] | — | 113 | 265 | 5.5 | 1¼ | Yes[d] | 1328 (148) | 3405 (119) | 4939 (109) | NM |

[a]Cement A
[b]0.028% sodium heptogluconate on Cement + Pozzolan
0.010% triethanolamine on Cement + Pozzolan
0.20% sodium chloride on Cement + Pozzolan
[c]Cement B
[d]0.028% sodium heptogluconate on Cement + Slag
0.010% triethanolamine on Cement + Slag
0.10% sodium chloride on Cement + Slag
[e]The numbers in ( ) represent the strength improvement as a percentage of the reference concretes, Mix No. 39 and 41.
[f]Not measured

EXAMPLE VII

Although the various combinations of chemicals used in the admixture of this invention were designed for the strength enhancement and set acceleration of Portland cement-pozzolan concrete, it was of interest to evaluate their performance in plain Portland cement concrete. The concrete test data, illustrated in Table X, indicated, unexpectedly, that the two mixtures of chemicals chosen for use in this series of test enhanced the strength of the concrete at all ages of test. The setting time measurements made on Concretes No. 51 and 52 also showed that the particular combination used in Concrete No. 52 accelerated the set of the concrete.

TABLE X

| Concrete Mix No. | Cement lbs/yd | Water lbs/yd. | Slump In. | Air % | Admixture | Compressive Strength-PSI | | | Setting Time[g] | |
|---|---|---|---|---|---|---|---|---|---|---|
| | | | | | | 1-Day | 7-Day | 28-Day | Initial Hrs:Min. | Final Hrs:Min. |
| 43 | 404[a] | 309 | 3 | 1.5 | No | 642 (100) | 2625 (100) | 3794 (100) | | |
| 44 | 404[a] | 305 | 3 | 1.8 | Yes[b] | 864 (135) | 3042 (116) | 4014 (106) | | |
| 45 | 638[a] | 389 | 2½ | 1.7 | No | 1433 (100) | 5301 (100) | 6531 (100) | | |
| 46 | 638[a] | 380 | 3 | 1.8 | Yes[b] | 2019 (141) | 5808 (110) | 6983 (107) | | |
| 47 | 500[c] | 294 | 3 | 1.7 | No | 892 (100) | 3257 (100) | 4787 (100) | | |
| 48 | 500[c] | 291 | 3 | 1.5 | Yes[b] | 1387 (155) | 3667 (113) | 5079 (106) | | |
| 49 | 510[d] | 307 | 2½ | 2.0 | No | 1042 (100) | 3744 (100) | 5191 (100) | | |
| 50 | 510[d] | 312 | 2¾ | 2.2 | Yes[b] | 1196 (115) | 4392 (117) | 5619 (108) | | |
| 51 | 495[e] | 284 | 2 | 1.7 | No | 1136 (100) | 3207 (100) | 4568 (100) | 5:16 | 7:13 |
| 52 | 500[e] | 280 | 2¼ | 2.5 | Yes[f] | 1595 (140) | 3836 (120) | 5248 (115) | 4:57 | 6:32 |

[a]Cement A
[b]Admixture -
Sodium heptogluconate - 0.028% solids on wt. of cement
Triethanolamine - 0.010% solids on wt. of cement
Sodium Chloride - 0.100% solids on wt. of cement
[c]Cement B
[d]Cement C
[e]Cement D
[f]Admixture -
Sodium gluconate - 0.028% solids on wt. of cement
Triethanolamine - 0.010% solids on wt. of cement
Sodium Chloride - 0.0100% solids on wt. of cement
Calcium lignosulfonate - 0.092% solids on wt. of cement
[g]ASTM - 403

It is claimed:

1. An admixture composition for Portland cement concrete containing Pozzolan, said admixture composition comprising a mixture containing at least one component from each of the following groups:
   (A) salts of lignosulfonic acids; hydroxylated carboxylic acids and salts thereof; and glucose polymers;
   (B) alkanolamines; and
   (C) sodium chloride; sodium nitrite; calcium nitrite; and formic acid;
said components from said groups being present in the following amounts, based upon the combined weight of cement and pozzolan in said concrete;
   Group (A), 0.014 to 0.203 percent by weight;
   Group (B), 0.005 to 0.300 percent by weight; and
   Group (C), 0.050 to 0.300 percent by weight.

2. The admixture composition of claim 1 comprised of a mixture containing (A) a salt of lignosulfonic acid; (B) triethanolamine; and (C) sodium chloride.

3. The admixture composition of claim 1 comprised of a mixture containing (A) a salt of gluconic acid or of heptogluconic acid; (B) triethanolamine; and (C) sodium chloride.

4. The admixture composition of claim 1 comprised of a mixture containing (A) a salt of gluconic acid or of heptogluconic acid; (B) an alkanolamine, (C) at least one member from the group consisting of sodium chloride, sodium nitrite, calcium nitrite and formic acid; and (D) a salt of lignosulfonic acid.

5. A concrete composition comprising Portland cement, pozzolan, and an admixture to improve the properties thereof, said admixture composition comprising a mixture containing at least one component from each of the following groups;
   (A) salts of lignosulfonic acids; hydroxylated carboxylic acids and salts thereof; and glucose polymers;
   (B) alkanolamines; and
   (C) sodium chloride; sodium nitrite; calcium nitrite; and formic acid;
said components from said Groups being present in the following amounts, based upon the weight of said cement and pozzolan:
   Group (A) about 0.014 to 0.203 percent by weight
   Group (B) about 0.005 to 0.300 percent by weight Group (C) about 0.050 to 0.300 percent by weight.

6. The concrete composition of claim 5 wherein said pozzolan is fly ash, natural pozzolan, blast furnace slag, or a mixture of such.

7. The concrete composition of claim 5 wherein said admixture is comprised of a mixture containing (A) salt of lignosulfonic acid; (B) triethanolamine; and (C) sodium chloride.

8. The concrete composition of claim 5 wherein said admixture is comprised of a mixture containing (A) a salt of gluconic acid or of heptogluconic acid; (B) triethanolamine; and (C) sodium chloride.

9. The concrete composition of claim 5 wherein said admixture is comprised of a mixture containing (A) a salt of gluconic acid or of heptogluconic acid; (B) an alkanolamine, (C) at least one member from the group consisting of sodium chloride, sodium nitrite, calcium nitrite and formic acid; and (D) a salt of lignosulfonic acid.

* * * * *